(12) United States Patent
Budaragin et al.

(10) Patent No.: US 7,718,221 B2
(45) Date of Patent: May 18, 2010

(54) COATINGS FOR METAL CASTING PARTS

(75) Inventors: Leonid V. Budaragin, Moscow (RU); Mark A. Deininger, Roswell, GA (US)

(73) Assignee: C-3 International, LLC, Alpharetta, GA (US)

( * ) Notice: Subject to any disclaimer, the term of this patent is extended or adjusted under 35 U.S.C. 154(b) by 0 days.

(21) Appl. No.: 10/440,802

(22) Filed: May 19, 2003

(65) Prior Publication Data

US 2004/0253438 A1    Dec. 16, 2004

Related U.S. Application Data

(63) Continuation-in-part of application No. 09/835,453, filed on Apr. 16, 2001, now abandoned, which is a continuation-in-part of application No. 08/824,418, filed on Mar. 26, 1997, now abandoned.

(60) Provisional application No. 60/014,260, filed on Mar. 28, 1996.

(51) Int. Cl.
B05D 3/02    (2006.01)

(52) U.S. Cl. .................................... 427/226

(58) Field of Classification Search ................ 427/226
See application file for complete search history.

(56) References Cited

U.S. PATENT DOCUMENTS

| | | | |
|---|---|---|---|
| 3,773,555 A * | 11/1973 | Cotton et al. ............... | 427/123 |
| 3,962,490 A * | 6/1976 | Ward .......................... | 427/193 |
| 4,267,483 A | 5/1981 | Nakajima et al. | |
| 4,307,061 A | 12/1981 | Sarholz | |
| 4,530,340 A | 7/1985 | Totman | |
| 4,743,793 A | 5/1988 | Toya et al. | |
| 4,786,267 A | 11/1988 | Toya et al. | |
| 4,826,462 A | 5/1989 | Lenk | |
| 4,828,934 A * | 5/1989 | Pinkhasov ................ | 428/622 |
| 4,853,582 A | 8/1989 | Sato et al. | |
| 4,881,913 A | 11/1989 | Mann | |
| 4,935,265 A | 6/1990 | Pike | |
| 4,937,484 A | 6/1990 | Ishino | |
| 4,963,112 A | 10/1990 | Benedikt et al. | |
| 4,963,390 A | 10/1990 | Lipeles et al. | |
| 4,972,811 A | 11/1990 | Baresel et al. | |
| 5,021,398 A * | 6/1991 | Sharma et al. ............. | 505/413 |
| 5,073,410 A | 12/1991 | Paz-Pujalt | |
| 5,109,178 A | 4/1992 | Yoshida et al. | |
| 5,274,298 A | 12/1993 | Cassidy et al. | |
| 5,279,111 A * | 1/1994 | Bell et al. .................... | 60/806 |
| 5,312,585 A * | 5/1994 | Jones ........................... | 422/7 |
| 5,601,869 A | 2/1997 | Scott et al. | |
| 5,612,082 A | 3/1997 | Azuma et al. | |
| 5,645,634 A | 7/1997 | Ogi et al. | |
| 5,699,035 A | 12/1997 | Ito et al. | |
| 5,827,570 A | 10/1998 | Russell | |
| 5,952,769 A * | 9/1999 | Budaragin ................. | 313/141 |
| 6,071,464 A | 6/2000 | Funaki et al. | |
| 6,139,921 A | 10/2000 | Taschner et al. | |
| 6,620,456 B2 * | 9/2003 | Blanton et al. ............. | 427/226 |
| 6,663,983 B1 * | 12/2003 | Darolia et al. ............. | 428/632 |
| 7,211,292 B1 | 5/2007 | Budaragin | |
| 2002/0041928 A1 | 4/2002 | Budaragin | |

FOREIGN PATENT DOCUMENTS

| | | |
|---|---|---|
| DE | 295148 | 10/1991 |
| EP | 1088908 | 4/2001 |
| FR | 2617507 | 1/1989 |
| RU | 923232 | 7/1980 |

OTHER PUBLICATIONS

Kling, Anton, et al., Ignition Devices, e.g., Spark Plugs, Hot Plugs, and the Like, Consisting of a Ceramic or Metallic Base and Whose Tip is Coated with an Oxide, and Their Manufacture, *Chemical Abstracts*, vol. 117, 1992 No. 8, Sec. 157, Abstract No. 075045.

Ooshima, Takafumi, "Durable Spark Plugs with Metal Oxide-Treated Tips," *Chemical Abstracts*, vol. 105, 1986 No. 26, Sec. 156, Abstract No. 231052w.

Southwest Research Institute's 1996 Annual Report for the fiscal year Sep. 30, 1995, to Sep. 27, 1996 [date unavailable].

(Continued)

*Primary Examiner*—Frederick J Parker
(74) *Attorney, Agent, or Firm*—J. Clinton Wimbish; Kilpatrick Stockston LLP

(57) ABSTRACT

The method is disclosed for coating or impregnating a metal tool with a metal oxide to render the metal part more resistant to liquid metal attack or micro-welds. The method includes the steps of applying a liquid metal carboxylate composition, or a solution thereof, to a substrate material, and exposing the substrate to an environment that will cause vaporization or dissipation of any excess carboxylic acids in the liquid metal carboxylate composition while the metal carboxylates are being converted to metal oxides.

29 Claims, No Drawings

OTHER PUBLICATIONS

Southwest Research Institute brochure entitled "Automotive Gear Oil Performance Testing," Automotive Fuels and Fluids Research Department, San Antonio, Texas, 08-1169-4, E117645 [date unavailable].

Brochure from Southwest Research Institute entitled "Technical Services," Automotive Products and Emissions Research Division, San Antonio, Texas, 08-06659-4 [date unavailable].

Southwest Research Institute brochure entitled "Vehicle Components, Evaluation, Research & Development," Program Development Office, San Antonio, Texas, MLT-0569-2 [date unavailable].

Southwest Research Institute brochure entitled "Automatic Transmission Fluids Testing," Automatic Transmission Fluids Section, San Antonio, Texas, 08-04659-2 [date unavailable].

Southwest Research Institute brochure entitled "Simulating Field Conditions in the Laboratory," Engine Lubricants Research Department, San Antonio, Texas [date unavailable].

Southwest Research Institute brochure entitled "Hydrocarbon Speciation," Characterization and Chemical Analysis Section, San Antonio, Texas, 08-0659-2 [date unavailable].

Southwest Research Institute brochure entitled "Intake System and Combustion Chamber Deposits Screening," Automotive Products and Emissions Research Division, San Antonio, Texas, 08-0459 [date unavailable].

International Search Report for PCT/US2004/014178 issued by the European Patent Office on Sep. 9, 2004.

Office Action for Canadian Patent Application No. 2,526,516 issued by the Canadian Intellectual Property Office on Jul. 8, 2008.

* cited by examiner

COATINGS FOR METAL CASTING PARTS

RELATED APPLICATIONS

This application is a continuation-in-part of U.S. application Ser. No. 09/835,453, filed Apr. 16, 2001, now abandoned, which is a continuation-in-part of U.S. application Ser. No. 08/824,418, filed Mar. 26, 1997, now abandoned, which claims priority to U.S. provisional application Ser. No. 60/014,260, filed Mar. 28, 1996, the entire contents of each of which are hereby incorporated by reference.

BACKGROUND OF THE INVENTION

1. Field of the Invention

The present invention relates to a method of providing a coating or film on the surfaces of materials exposed to molten metals. In particular, the invention relates to a method of coating a metal part to make it resistant to soldering or "liquid metal attack" when exposed to molten metals, by applying to one or more surfaces of the metal part a composition containing a liquid metal carboxylate, followed by heat treatment of the coated metal part.

2. Description of Related Art

The metal casting industry provides more than 90% of all manufactured goods and capital equipment for manufacture of other goods in the United States. It is a significant component in the manufacture of automobiles, trucks, agricultural and construction equipment, railroads, pipes, fittings, valves, and engines. In the U.S. alone, there are approximately 3000 operating foundries, employing around 250,000 people.

A significant problem in the metal casting industry, and one which decreases energy efficiency in an already energy intensive industry, is termed "liquid metal attack." Liquid metal attack occurs when the molten metal being cast adheres or "solders" to the mold or die. Liquid metal attack can occur where solid metal parts, such as molds, dies, ladles, sheaths, pins, tooling, and other parts, come into contact with molten metal. This can occur during die casting, smelting, or other stages of metal processing where molten metal contacts a solid metal material. The molten metal causes wear and erosion of the solid metal parts, increasing both capital costs and costs associated with increased labor and downtime.

In addition, efficiency of die casting processes are reduced by liquid metal attack, and the scrap rate of die casting processes is increased. For example, the aluminum die casting industry melts about 2 lbs of aluminum for every pound of die cast aluminum shipped. An increase in yield of only 20% would save approximately $2.7 \times 10^{12}$ BTU/yr.

A method of preventing liquid metal attack on solid metal tools used to process molten metals would provide an enormous cost and energy savings to a number of industries, not limited to the die casting industry, but extending to those industries that rely on metal casting to provide critical parts. Before this invention, no coating solution had been found that sufficiently withstands the corrosive nature of molten aluminum. Extending the useful lifetime of dies would significantly reduce time between costly die replacements.

Moreover, to the inventor's knowledge, coating techniques have not been described that provide the ability to do an "in field" coating of metal parts that is resistant to liquid metal attack. To the contrary, coatings used to limit wear, erosion, or corrosion for die-casting dies are typically applied in a super controlled atmosphere, e.g., by physical vapor deposition (PVD) or chemical vapor deposition (CVD), which can require elaborate safety equipment. This presents a disadvantage because it becomes economically infeasible to apply a CVD or PVD "in field." In addition, such coatings, such as CrN, CrC, BC, VC, $CrN_2$, and ion nitriding, often fail by spalling due to mismatched thermal coefficient of expansion (TCE) with the solid metal substrate. This is in part because of the relatively thick coatings (5 to 15 μm) that can be applied with these techniques.

SUMMARY OF THE INVENTION

This invention provides a coating for solid metal parts that provides excellent resistance to liquid metal attack. The coating provides a thin layer of transition metal oxide or rare earth metal oxide, in particular zirconia or ceria or combinations of these, on solid metal parts. This coating significantly reduces the ability of molten metal to adhere to the metal part. In the method of the invention, the surface of the metal part is coated with a composition of liquid metal carboxylate followed by heat treatment in non-oxidizing atmosphere at a minimum temperature of 400° C. for about 3-5 minutes thereby forming a hard oxide layer on the surface of the part. This oxide layer helps to prevent molten metal from adhering to the metal part, thereby prolonging the useful life of the part. Without wishing to be bound by any theory, it is believed that the oxide layer penetrates a distance into the surface of the coated metal, thereby providing good wear characteristics and durability to the coating. The invention relates both to the method for coating the metal part to increase resistance to liquid metal attack, and to the metal parts so coated.

The invention provides a relatively inexpensive industrial method for extending the useful life of metal parts, such as those made of steel, by protecting the parts from liquid metal attack by, e.g., molten aluminum or micro-welding. It is therefore particularly suited to application in the aluminum smelting and casting processes, in particular, metal die casting industries, in order to protect and prolong the life of steel sheaths, pins, ladles, molds, dies, and other metal materials used in the smelting and/or die casting of aluminum or other liquid metals, such as steel or copper, and in other metal forming equipment such as stamps, dies, and punches wherever micro-welding is problematic.

For example, steel protective sheaths for thermocouples were coated according to the invention (coating with metal carboxylate followed by heat treatment); the coating was found to extend the useful exposure time significantly, with only slight scaling or pitting, and with around 95% of the surface not wetted by molten aluminum. Uncoated sheaths typically survive 80-90 cycles (45 sec. dips in liquid aluminum) in a test that is routinely conducted by the manufacturer. Those treated 6 times with zirconia using the present invention lasted 706 cycles, while those treated with ceria 6 times lasted 606 cycles. With fewer coatings, Zr appeared to give 20 to 30% more life extension than Ce, but both more than doubled the life of the thermocouple sheaths.

In addition, the coated materials of the invention are protected against corrosion, wear, erosion, and other degradations by virtue of the metal oxide coating. The coating of the invention is also advantageous in that it can be applied on a large scale using simple processes, such as dipping or spraying, that do not require large scale capital investment. Standard vacuum or inert gas furnaces which are already used to heat treat (to anneal, harden, strengthen) steel tools can be used to apply the coating; the coating can be applied "in the field." Toxic gases are not needed or produced, rendering the coatings environmentally friendly.

Another advantage over PVD and CVD processes is the low temperature of the process of the invention. For example, CVD coatings require heating the metal tool to temperatures in excess of 900 to 1000 degrees C., and sometimes exceeding 1000 degrees C. These extreme temperatures can damage the tool by weakening the steel's strength or deforming the tool making it unusable or of greatly diminished value. The present invention treats tools typically at a temperature range of between 400-520° C., or less, which is low enough to avoid tool deformation or damage of any kind. In addition, most PVD coatings require direct line-of-sight application, which makes its application difficult or impossible where the tool to be treated has a convoluted or irregular surface. The present invention is a "dip and bake" process, whereby the liquid easily covers, through capillary action, the entire surface area to be treated, no matter what contours or unusual tool shapes may be involved.

The coating of the invention also does not change significantly the dimensions of the metal casting cavity, so that the coating can be applied without altering die cavities or changing component tolerances.

In another embodiment, the invention relates to the discovery that high temperature phase cubic zirconia, or in the alternative ceria, optionally in the presence of yttrium or other rare earth stabilizers, can provide a stable protective coating on metal parts that persists at room temperature or while in use at high temperatures, much higher in fact than the temperature at which they were treated in the furnace or other heating apparatus.

These and other features and advantages of the present invention will become apparent after a review of the following detailed description of the disclosed embodiments and the appended claims.

DETAILED DESCRIPTION OF SPECIFIC EMBODIMENTS

The present invention is directed to a method of coating the surface of one or more solid metal parts that are adapted to contact molten metal, in order to limit the effect of liquid metal attack, by applying to the surface of the metal parts a composition of one or more liquid metal carboxylates, and exposing the parts to an environment that will cause vaporization or dissipation of any excess carboxylic acids. This typically involves contacting the coated parts with heat in a non-oxidizing atmosphere. This heat treatment causes conversion of the liquid metal carboxylate into one or more metal oxides, thereby forming a hard oxide layer on (and in some cases in) the surface of the part. This layer extends the life of the part and prevents adherence of molten metal to the part, thereby reducing the formation of scrap, and decreasing energy consumption.

As used herein, the term "resistant to liquid metal attack" indicates that the coated material is able to survive longer, or more cycles of, exposure to liquid metal, with less wetting, welding, soldering, pitting, or scaling, than the corresponding uncoated material.

The term "micro-welds" herein involves thermodynamics similar to "liquid metal attack" wherein metals have a tendency to attach or bond to each other at high temperatures. However, instead of involving hot liquid metal, when the heat is generated by friction, shear or intense compression that occurs in metal forming operations such as punching, cutting or stamping, tiny microscopic welds can form on the surfaces of the metal forming tool. Micro-welds sometimes give the appearance that the tools suffer from scoring, wear, erosion and/or lack of lubricity when in fact it is micro-welds which are causing the problem.

The term alkyl, as used herein, refers to a saturated straight, branched, or cyclic hydrocarbon, or a combination thereof, typically of $C_1$ to $C_{24}$, and specifically includes methyl, ethyl, n-propyl, isopropyl, n-butyl, isobutyl, t-butyl, n-pentyl, cyclopentyl, isopentyl, neopentyl, n-hexyl, isohexyl, cyclohexyl, 3-methylpentyl, 2,2-dimethylbutyl, 2,3-dimethylbutyl, heptyl, octyl, nonyl, and decyl.

The terms alkenyl and alkynyl, as used herein, refer to a $C_2$ to $C_{24}$ straight or branched hydrocarbon with at least one double or triple bond, respectively.

The term aryl or aromatic, as used herein, refers to phenyl, naphthyl, or substituted phenyl or naphthyl, wherein the substituent is alkyl, alkenyl, alkynyl or alkoxy.

The present invention provides a composition of liquid metal carboxylates. The liquid metal carboxylate composition is a solution of the carboxylic acid salts of one or more metals ("metal carboxylate"). Metal carboxylates are well known and can be produced by a variety of methods known to one skilled in the art. Non-limiting examples of methods for producing the metal carboxylate are shown in the following reaction schemes:

n RCOOH+Me→$(RCOO)_n Me^{n++}$0.5n$H_2$ (for alkaline earth metals, alkali metals and thallium);

n RCOOH+$Me^{n+}(OH)_n$→$(RCOO)_n Me^{n++}$+$H_2O$ (for practically all metals having a solid hydroxide);

n RCOOH+$Me^{n+}(CO_3)_{0.5n}$→$(RCOO)_n Me^{n++}$+$H_2O$+0.5n $CO_2$ (for alkaline earth metals, alkali metals and thallium); and n RCOOH+$Me^{n+}(X)m$→$(RCOO)_n Me^{n++}$+n/m$H_m X$ (liquid extraction, usable for practically all metals having solid salts).

The liquid metal carboxylate composition can contain a single metal, to form a single metal carboxylate, or a mixture of metals, to form a corresponding mixture of metal carboxylates. In addition, the composition may contain different carboxylate moieties. Preferably, the liquid metal carboxylate composition contains a mixture of metals, as these compositions form mixed oxides having superior properties.

Preferably, the solvent used in the liquid metal carboxylate composition is an excess of a liquid carboxylic acid which was used to form the metal carboxylate. Alternatively, the solvent can be another carboxylic acid, or a solution of a carboxylic acid in another solvent, including, but not limited to, organic solvents such as benzene, toluene, chloroform and dichloromethane.

Carboxylic acids that are suitable for use to form the liquid metal carboxylate composition are those which: (1) can form a metal carboxylate, where the metal carboxylate is soluble in excess acid or another solvent; and (2) can be vaporized in a temperature range that overlaps the oxide conversion temperature range.

The carboxylic acid should have a formula R—COOH, where R is alkyl, alkenyl, alkynyl or aryl.

Preferably, the liquid monocarboxylic acid comprises one or more carboxylic acids having the formula I below:

R—C(R")(R')—COOH             (I)

wherein:

R is selected from H or $C_1$ to $C_{24}$ alkyl groups; and

R' and R" are each independently selected from H or $C_1$ to $C_{24}$ alkyl groups.

These alpha branched carboxylic acids typically have an average molecular weight in the range 130 to 420. More particularly, the carboxylic acids have an average molecular weight in the range 220 to 270. The carboxylic acid may also be a mixture of tertiary and quaternary carboxylic acids of formula I. VIK acids can be used as well.

Either a single carboxylic acid or a mixture of carboxylic acids can be used to form the liquid metal carboxylate. Preferably, a mixture of carboxylic acids is used. More preferably, the mixture contains 2-ethylhexanoic acid where R is H, R" is $C_2H_5$ and R' is $C_4H_9$. Typically, this acid is the lowest boiling acid constituent in the mixture.

The use of a mixture of carboxylates provides several advantages. First, the mixture has a broader evaporation temperature range, making it more likely that the evaporation temperature of the acid mixture will overlap the metal carboxylate decomposition temperature, allowing the formation of an optimum oxide coating. Second, the production of purified individual acids is expensive. Thus, the use of an individual acid could unnecessarily raise the cost of this method.

In general, the liquid metal carboxylate mixture typically contains one metal carboxylate as its major component and one or more additional metal carboxylates which may function as stabilizing additives. The stabilizing additives are typically trivalent metal carboxylates. Exemplary trivalent metal carboxylates include chromium, iron, manganese and nickel carboxylates. The liquid metal carboxylate composition can contain both cerium and chromium carboxylates.

Metals that are particularly suitable for use to form the liquid metal carboxylates include those selected from the group consisting of: Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Platinum, Lanthanum, Hafnium, Vanadium, Niobium, Molybdenum, Indium, Promethium, Plutonium, Curium, Californium, Tantalum, Gold, Thallium, Lead, Bismuth, Praseodymium, Neodymium, Samarium, Europium, Gadolinium, Terbium, Dysprosium, Holmium, Erbium, Thulium, Ytterbium, Lutetium, Thorium and Uranium.

Any of the above metals or combinations thereof can be used to form coatings according to the present process. Depending on the particular metal part being coated, those skilled in the art can select appropriate metal mixtures to form the desired metal or metal oxide coating.

For most compositions useful in coating metal parts, the metal forming the metal carboxylate that is the major component of the liquid metal carboxylate composition contains an amount of metal that is from about 65 to about 97% by weight, more particularly from about 80 to about 87% by weight, relative to the total weight of metal in the composition. More particularly, the metal forming the metal carboxylate which is the major component is present in an amount from about 80-87% by weight. Alternatively, the amount of metal forming the major component of the metal carboxylate composition is in the range from about 90-97% by weight, based upon the total metal present in the composition.

The metal carboxylates that may function as stabilizing additives should be present in amounts such that the total amount of the metal in metal carboxylates which are the stabilizing additives is at least 3% by weight, relative to the total weight of the metal in the liquid metal carboxylate composition. This can be achieved by using a single stabilizing additive, or multiple stabilizing additives, provided that the total weight of the metal in the stabilizing additives is greater than 3%, more particularly, the total weight of the metal in the stabilizing additives ranges from about 3% to about 35% by weight, even more particularly, the total weight range for the metal in the stabilizing additives ranges from about 3 to about 30% by weight. Even more particularly, the total weight range for the metal in the stabilizing additives ranges from about 3 to about 10% by weight. In some embodiments, the total weight range for the metal in the stabilizing additives is from about 7 to about 8%.

Non-limiting examples of liquid metal carboxylate compositions suitable for use in the invention are set forth below. In these compositions, weight range percentages for the metals are based on 100 percent total by weight of the metal in the liquid metal carboxylate composition. As noted above, the minimum amount of the stabilizing additives, those defined below as being present in "up to" a certain amount, is a total stabilizing additive weight of at least 3 percent. For example, the liquid metal carboxylate composition can have at least 3% of a single stabilizing additive or at least 1.5% of one stabilizing additive and at least 1.5% of another, or at least 2% of one stabilizing additive and at least 1% of another.

The amount of metal in the liquid metal carboxylate composition should be enough to provide an adequate metal oxide coating. Generally, this amount is in the range from about 20 to about 300 grams of metal per kilogram of liquid metal carboxylate composition. More specifically, the amount of metal in the liquid metal carboxylate composition can range from about 30 to about 200 grams of metal per kilogram of liquid metal carboxylate composition. More particularly, the liquid metal carboxylate composition can contain from about 40 to about 80 grams of metal per kg of composition when using ceria, and 100 grams to 300 grams when using zirconia.

Amounts of metal less than 20 grams per kg of composition can be used. However, this low concentration of metal may not be sufficient to obtain a non-porous coating during the first cycle of the coating process. As a result, the process will likely have to be repeated several times to provide an adequate coating.

Similarly, amounts of metal greater than 300 grams per kg of composition can be used. However, the use of more metal leads to the unnecessarily excessive material consumption, thereby raising the cost of the method of the invention. However, it is generally desirable to apply multiple coatings to the substrate for optimal results, as indicated below.

A particular liquid metal carboxylate composition that has been found to be suitable comprises 2-ethylhexanoic acid and metal 2-ethylhexanoates (e.g., sold under the name Alfa Aesar A. by Johnson Matthey Co., 1999-2000). The mass proportions of the components are as follows (metal weight percentages are given relative to the total weight of metal in the liquid metal carboxylate composition):

| Yttrium | 3 to 10% |
| --- | --- |
| Chromium | 2 to 5% |
| Zirconium | balance |

The above metals are typically present in the liquid metal carboxylate composition in an amount ranging from about 30 grams to about 300 grams of metal per kilogram of liquid metal carboxylate, more particularly, from about 100 grams to about 200 grams of metal per kilogram of liquid metal carboxylate composition.

Another suitable liquid metal carboxylate composition comprises 2-ethylhexanoic acid and metal 2-ethylhexanoates. The mass proportions of the components are as follows (metal weight percentages are given relative to the total weight of metal in the liquid metal carboxylate composition):

| Yttrium | 7 to 8% |
| --- | --- |
| Chromium | 2 to 3% |
| Zirconium | 89 to 91% |

The above metals are preferably present in the liquid metal carboxylate composition in an amount of about 100 to 300 grams of metal per kilogram of liquid metal carboxylate composition.

Another suitable liquid metal carboxylate composition comprises 2-ethylhexanoic acid and metal 2-ethylhexanoates (e.g., sold under the name Alfa Aesar A. by Johnson Matthey Co., Catalogue for Research Chemical Metals and Materials). The mass proportions of the components are as follows (metal weight percentages are given relative to the total weight of metal in the liquid metal carbolylate composition):

| | |
|---|---|
| Yttrium | 14–15% |
| Cerium | balance. |

The above metals are preferably present in the liquid metal carboxylate composition in an amount of about 40 to 80 grams of liquid metal carboxylate composition.

As discussed above, the primary purpose of the disclosed method is the production of a metal oxide coating on the surface of a metal part adapted to contact molten metal. To prepare the metal part for coating, one can use any hydrocarbon solvent, alcohol, ketones, fluorine or chlorine containing hydrocarbons, amides, carboxylic acids, synthetic washing fluids, water steam treatment, or any other method to clean the surface of the part of any oils, greases, dirt, or other materials that may interfere with the deposition of the metal oxide coating. The solvent is desirably allowed to evaporate from the surface of the part. The liquid metal carboxylate composition can be applied to the metal part neat (without the use of an additional solvent) or in solution. Preferably, the liquid metal carboxylate composition is applied without a solvent.

Any known method of application of the liquid metal carboxylate composition is suitable for use in the present process, so long as it provides an adequate coating of the liquid metal carboxylate composition on the metal part. For example, the metal part can be dipped into a container of the liquid metal carboxylate composition. Alternatively, a swab, sponge, dropper, pipet, spray, brush or other applicator can be used to apply the liquid metal carboxylate composition to the metal part. Other methods of application may also be acceptable.

The liquid metal carboxylate composition should be applied at a temperature less than about 50° C. Preferably, the liquid metal carboxylate composition is applied to the metal part at room temperature.

Following application of the liquid metal carboxylate composition to the metal part, the component is exposed to an environment sufficient to vaporize or dissipate excess carboxylic acid in the liquid metal carboxylate composition and to convert the metal carboxylates to metal oxides. The temperature for the treatment should be selected such that the temperature ranges for the evaporation of the carboxylic acid and the formation of the metal oxide overlap, and the temperature should not damage the component onto which the coating is being applied.

The minimum decomposition temperature for carboxylate is about 400° C. More particularly, the temperature can range from about 400 to about 650° C. Even more particularly, the temperature range is from about 400 to about 550° C. By contrast, metal parts made of steel may lose some of their desirable properties (microhardness) at temperatures exceeding 500° C. As a result, the heat treatment cycle of such parts should not exceed about 450° C.

During the exposure step of the process, two subprocesses are believed to take place (although the inventor does not wish to be bound by any theory of the mechanism by which the method functions). These subprocesses can occur at different temperature levels. The first subprocess is the evaporation or decomposition of any excess carboxylic acid or other solvent in the liquid metal carboxylate composition. This forms a metal carboxylate layer on the surface of the component. The second stage is the decomposition of the metal carboxylate layer to a metal oxide layer and fixation of that layer on the backing or surface of the metal part.

To create an oxide layer which is fixed to the surface of the metal part, it is preferred that there be an interaction between any excess carboxylic acid on the part and the metal oxide coating formed during the coating process. Optimum oxide layer production (which provides maximum life extension) occurs when the carboxylate decomposition temperature range and the acid evaporation temperature range overlap. That is, when the carboxylate decomposition stage commences, the removal and decomposition of the acid is not complete. Complete removal of the acid prior to the commencement of carboxylate decomposition can significantly reduce or practically eliminate the adhesion of the oxide coating to the metal part, and the coating will peel off the substrate completely.

Without wishing to be bound to any particular mechanism, it is believed that the following process occurs during the production of the oxide coating. At high temperatures, it is believed that the carboxylic acid etches or otherwise interacts with the surface of the metal, thereby activating it. This allows interaction between the metal carboxylate and the activated surface of the metal, resulting in the formation of a metal-oxide link when the metal carboxylate is subsequently converted into metal oxide.

The heating can be conducted either by placing the coated metal part onto a rack or support and then into a furnace, which has been preheated to a desired temperature, or by placing the coated metal part into a furnace, followed by heating the furnace to the desired temperature. Any conventional furnace can be used, as no special heating equipment is required, provided, of course, that the furnace will accommodate the size and shape of the component being treated: the surface of the part must be heated relatively uniformly.

In general, the metal part should be heated for a time adequate to produce a uniform oxide coating. For a furnace which has been preheated to a temperature at least about 450° C., a preferred minimum time is about 3 to 5 min. The heat treatment cycle must be long enough to let the carboxylate decompose completely and form the corresponding metal oxide layer on the surface of the metal part.

Forced air cooling may be used to accelerate the cooling process. The component should not be cooled by treating it with a liquid coolant, as this could damage the coating or the component.

As noted above, while active heating to high temperatures is the preferred method of converting the metal carboxylate to a metal oxide coating, the exposure step can also be carried out in some situations by exposing the parts to ambient air conditions for sufficient time to fix the metal oxide coating to the metal part. This time is generally substantially longer than the time required for active heating.

However, the present process is usually carried out in a vacuum or inert gas in a standard furnace or infra-red heating apparatus. Accordingly, there is no need to provide any special atmosphere other than these during the heating process. However, should it be desired, the present process can also be conducted in specialized atmospheres. If a specialized atmosphere is used, it is preferably a non-oxidizing atmosphere, that is, one which is devoid of any significant amount of oxygen.

The method of the invention prevents or inhibits adherence of the hot liquid metal (or metal made hot enough to micro-weld through metal forming activity such as stamping- compression- or punching-friction), to the surface of the metal tool. The method can be used either during the manufacturing process for making the metal tool, or on the completed metal tool as an "in field" heat treatment or after-treatment. The coating process of the invention can be used in conjunction with or subsequent to any known process for manufacturing metal tool without damaging the tool or weakening the strength of the steel tool through deformation caused by excessive heat.

Metal parts which can benefit from the protection provided by this invention include any which will come into contact with molten metal, and for which liquid metal attack can be a problem. Examples include tools, such as steel sheaths used to protect thermocouples in aluminum die casting, die cast molds and pins, ladles, or metal forming tools such as stamps, dies, cutting tools and punches where micro-welds are problematic.

The method of the invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

II. EXAMPLES

The following examples illustrate the application of the present process to the coating of metal parts.

Example 1

Preparation of the Metal Carboxylate

A. Zirconia

Components utilized in preparation of the metal carboxylate were obtained from the Johnson Matthey Co. (1999-2000) catalog as Alfa Aesar A. The components are the salts of acid and metal. It is necessary to dilute them with pure acid in order to use them in the process. Specifically, 350 grams of 2-ethylhexanoic acid (Stock No. 15419, p. 304) and 15 grams of yttrium 2-ethylhexanoate (Stock No. 36661, p. 820 (powder form)) were put into a heated reactor with a mixer inside. While the components were being stirred, the reactor was heated up to 75 to 80° C. After about an hour, the yttrium 2-ethylhexanoate had dissolved in the acid completely. The stirred solution was then allowed to cool at room temperature. After the solution had cooled, 15 grams of chromium 2-ethylhexanoate (Stock No. 89304, p. 200) and 560 grams of zirconium 2-ethylhexanoate (Stock No. 39543, p. 839) were added. In addition, 2-ethylhexanoic acid was added until the mass reached 1 kilogram. The solution was then stirred thoroughly for 1-2 minutes at room temperature, making it ready for coating.

B. Ceria

Components utilized in preparation of the metal carboxylate were obtained from the Johnson Matthey Co. (1999-2000) catalog as Alfa Aesar A. The components are the salts of acid and metal. It is necessary to dilute them with the pure acid in order to use them in the process. Specifically, 350 grams of 2-ethylhexanoic acid (Stock No. 15419, p. 304) and 30 grams of yttrium 2-ethylhexanoic (Stock No. 36661, p. 820 (a powder form of salt)) were put into a heated reactor with a mixer inside. While the components were being stirred, the reactor was heated up to 75 to 80° C. After about an hour, the yttrium 2-ethylhexanoic had dissolved in the acid completely. The stirred solution was then allowed to cool at room temperature. After the solution had cooled, 300 grams of cerium 2-ethylhexanoate (Stock # 40451 (liquid form)) was added. In addition, 2-ethylhexanoic acid was added until the mass reached 1 kilogram. The solution was then stirred thoroughly by 1-2 minutes at room temperature, making it ready for coating.

Example 2

Preparation of Metal Part

Metal parts, such as die-casting dies, ladles, sheaths, pins, and other metal forming equipment tools to be coated may be covered with protective lubricants, dirt, or other materials either from use or the process used to manufacture them and therefore may require cleansing. This can be accomplished using a suitable cleansing solvent or other fluid (e.g., placing the parts in boiling carbon tetrachloride solvent for approximately 10 to 15 minutes.)

Example 3

Coating of Thermocouple Sheaths

The ability of coatings prepared according to this invention to protect thermocouple sheaths against liquid metal attack by molten aluminum was tested through Oak Ridge National Laboratories (ORNL) oversight. 1010 steel thermocouple sheaths were coated with the coating described in Example 1, by dipping the sheaths in the coating liquid at room temperature, and heating the dipped sheaths at temperatures between 490° C. and 510° C. This process was repeated a total of 6 times. The coated and heat treated sheaths were exposed to molten aluminum at 1400° F. by dipping the coated sheaths in the aluminum for 45 seconds and then removing them and holding them for 4 minutes at a temperature of 700 to 800° F. before re-exposure. Uncoated sheaths were similarly dipped as a control. The coating of the invention was found to extend the useful life of the sheaths from 81 cycles (uncoated controls) to 706 cycles when using zirconia, 606 cycles when using ceria, with the only damage to the coated sheaths being some slight scaling and pitting, but with approximately 95% of the surface area not wetted by the molten aluminum. The coating of the invention was found to provide an increase in useful life of the thermocouple sheath by about 875% when using zirconia and about 750% when using ceria.

As explained above, the coating of the invention provides increased durability, in part, because it penetrates the surface of the coated metal to a depth, usually around 200 to 600 Angstroms, providing a firm anchor to the material being coated without the need for intermediate bonding layers. This allows a much thinner coating, typically around 0.1 to 1 µm in thickness—i.e., about 0.5 microns when, say, 6 layers are used—to be applied and provide equivalent protection to that provided by existing coating technologies. This allows for cost savings in terms of the amount of coating material applied and retooling to allow for coating thickness in any important tolerances. In addition, the effect of any mismatches is minimized by the use of much thinner coating material. The process of the invention permits the use of coatings of a wide variety of materials, including application of Ce and Zr coatings to solid metals which were previously not thought capable of being coated with these materials, such as steel (or at the very least the use of exotic processes that involve expensive, and often commercially infeasible contact bonding agents, are required before Zr or Ce can be applied). The present invention is a relatively low temperature process that does not damage or deform the steel tool, does not produce toxic or corrosive waste materials, and can be done on site, or "in the field" without the procurement of expensive capital equipment.

The clear environmental and energy conservation benefits, and the avoidance of high temperature heat treatments and harsh chemical environments is beneficial in maintaining the desired strength or other properties of the metal parts being treated.

While not wishing to be bound by any theory, it has been found that the coating applied to the metal parts according to the above examples is a form of cubic zirconia that is stable at low temperatures, and is very fine grained (typically around 3 nm grain size, as determined by X-ray diffraction). The presence of yttrium in small quantities can enhance the ability of this form of cubic zirconia to remain stable at temperatures near room temperature. On the other hand, while ceria may generate perhaps 20-30% less life extension than Zr in some applications, Ce can be used in large scale treatments—where the need to keep the material cost of the treatment to a minimum, may outweigh the need for maximum life extension properties.

What is claimed is:

1. A method for reducing liquid metal attack on a solid metal part, comprising:
   (a) applying a liquid metal carboxylate composition to a solid metal part substrate, wherein the liquid metal carboxylate composition comprises a solution of a metal salt of a carboxylic acid in a solvent, and
   (b) heating the part with the applied liquid carboxylate in a non-oxidizing environment that will convert at least some of the metal carboxylates to metal oxides; wherein the metal oxides penetrate the solid metal part substrate to a depth of about 200 Angstroms to about 600 Angstroms.

2. The method of claim 1, wherein the solvent comprises a carboxylic acid, and wherein heating the metal part in a non-oxidizing environment causes vaporization or dissipation of any carboxylic acid solvent.

3. The method of claim 2, wherein the solvent comprises at least one carboxylic acid that corresponds to a carboxylate moiety in the liquid metal carboxylate composition.

4. The method of claim 1, wherein the carboxylic acid is a carboxylic acid having the formula

wherein:
R is selected from H and $C_1$ to $C_{24}$ alkyl groups; and
R' and R" are each independently selected from H or $C_1$ to $C_{24}$ alkyl groups.

5. The method of claim 4, wherein the carboxylic acid is alpha-branched, wherein at least two of R, R' and R" are not H.

6. The method of claim 5, wherein R is H, R" is $C_2H_5$ and R' is $C_4H_9$.

7. The method of claim 1, wherein the carboxylic acid is a mixture of carboxylic acids.

8. The method of claim 7, wherein the average molecular weight of the acids contained in this mixture is from about 130 to 420.

9. The method of claim 7, wherein the average molecular weight of the acids contained in this mixture is from about 220 to 270.

10. The method of claim 9, wherein the mixture of carboxylic acids contains 2-ethylhexanoic acid as its lowest boiling acid constituent.

11. The method of claim 1, wherein the liquid metal carboxylate composition comprises a mixture of metals.

12. The method of claim 1, wherein the liquid metal carboxylate composition comprises one or more metals selected from the group consisting of Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Lanthanum, Hafnium, Tantalum, Gold, Thallium, Lead, Bismuth, Cerium, Praseodymium, Neodymium, Samarium, Europium, Gadolinium, Terbium, Dysprosium, Holmium, Erbium, Thulium, Ytterbium, Lutetium, Thorium and Uranium.

13. The method of claim 1, wherein the liquid metal carboxylate composition comprises Zirconium.

14. The method of claim 11, wherein the liquid metal carboxylate comprises a mixture of metals comprising:
   up to 10% by weight of yttrium;
   up to 5% by weight of chromium; and
   the balance zirconium;
   wherein the minimum total amount of yttrium is at least 3% and the minimum total of chromium is at least 2%.

15. The method of claim 11, wherein the liquid metal carboxylate comprises a mixture of metals comprising:
   7 to 8% by weight of yttrium;
   2 to 3% by weight of chromium; and
   89 to 91% by weight of zirconium.

16. The method of claim 11, wherein the liquid metal carboxylate comprises a mixture of metals comprising:
   14-15% by weight of yttrium;
   the balance cerium.

17. The method of claim 2 wherein the vaporization or dissipation of any excess carboxylic acids in the liquid metal carboxylate composition and conversion of the metal carboxylates to metal oxides is carried out by heating the coated metal part.

18. The method of claim 17, wherein the metal part is heated at a temperature greater than about 400° C.

19. The method of claim 17, wherein the metal part is heated at a temperature less than about 480° C.

20. The method of claim 17, wherein the metal part is heated for about 3 to 5 minutes.

21. The method of claim 17, wherein the metal part is heated for more than about 5 minutes and less than about 20 minutes.

22. The method of claim 1, wherein the amount of metal in the liquid metal carboxylate composition is in the range of 30 to 80 grams of metal per kilogram of liquid metal carboxylate composition when using ceria.

23. The method of claim 1, wherein the amount of metal in the liquid metal carboxylate composition is in the range of about 100 to about 300 grams of metal per kilogram of liquid metal carboxylate composition when using zirconia.

24. The method of claim 22, wherein the amount of metal in the liquid metal carboxylate composition is 30 to 80 grams of metal per kilogram of liquid metal carboxylate composition.

25. The method of claim 23, wherein the amount of metal in the liquid metal carboxylate composition is about 100 to about 300 grams of metal per kilogram of liquid metal carboxylate composition.

26. A method for reducing liquid metal attack on a solid metal part, comprising:
   (a) applying a liquid metal carboxylate composition to a solid metal part substrate, wherein the liquid metal carboxylate composition comprises a solution of a metal salt of a carboxylic acid in a solvent, and
   (b) heating the metal part comprising the applied liquid metal carboxylate composition in a non-oxidizing environment to a temperature of less than or equal to 450° C.; and
   (c) converting at least some of the metal carboxylates to metal oxides in the non-oxidizing environment.

27. A method for reducing liquid metal attack on a solid metal part, comprising:
   (a) applying a liquid metal carboxylate composition to a solid metal part substrate, wherein the liquid metal carboxylate composition comprises a solution of a metal salt of a carboxylic acid in a solvent, and
   (b) heating the part with the applied liquid carboxylate in a non-oxidizing environment at a temperature of less than or equal to about 450° C. to convert at least some of the metal carboxylates to metal oxides, wherein the metal oxides penetrate the solid metal part to a depth of about 200 Angstroms to about 600 Angstroms.

28. The method of claim 27, wherein metal part substrate is heated for about 3 minutes to about 5 minutes.

29. The method of claim 28, wherein the metal part substrate is heated at a temperature of less than about 450° C.

* * * * *